US011384856B2

(12) United States Patent
Kelton et al.

(10) Patent No.: US 11,384,856 B2
(45) Date of Patent: Jul. 12, 2022

(54) SPHERICAL PUMP VALVE

(71) Applicant: Triangle Pump Components, Inc., Cleburne, TX (US)

(72) Inventors: Samuel Thomas Kelton, Cleburne, TX (US); Cedric Wayne Hill, Fort Worth, TX (US); Jon Alan Edson, Venus, TX (US)

(73) Assignee: Triangle Pump Components, Inc., Cleburne, TX (US)

( * ) Notice: Subject to any disclaimer, the term of this patent is extended or adjusted under 35 U.S.C. 154(b) by 352 days.

(21) Appl. No.: 16/782,335

(22) Filed: Feb. 5, 2020

(65) Prior Publication Data
US 2021/0239229 A1 Aug. 5, 2021

(51) Int. Cl.
*F16K 15/02* (2006.01)
*F16K 17/04* (2006.01)
*F04B 53/10* (2006.01)

(52) U.S. Cl.
CPC ........ *F16K 17/044* (2013.01); *F04B 53/1032* (2013.01); *F16K 15/028* (2013.01)

(58) Field of Classification Search
CPC ... F16K 15/028; F16K 17/044; F04B 53/1032
USPC .................................................. 137/543.16
See application file for complete search history.

(56) References Cited

U.S. PATENT DOCUMENTS

| | | |
|---|---|---|
| 170,974 A * | 12/1875 | Westwater ............ F16K 15/063 137/543.13 |
| 1,693,355 A | 11/1928 | Thompson |
| 2,161,833 A | 6/1939 | Paget |
| 2,274,996 A | 3/1942 | Spinney |
| 2,329,576 A | 9/1943 | Anderson |
| 2,683,464 A | 7/1954 | St Clair |
| 2,710,023 A | 6/1955 | Blackford et al. |
| 2,904,065 A | 9/1959 | Butlin |
| 2,940,472 A | 6/1960 | Chilcoat |
| 3,025,874 A | 3/1962 | Yocum |
| 3,029,835 A | 4/1962 | Biello et al. |
| 3,358,770 A | 12/1967 | Zandmer |
| 3,457,949 A | 7/1969 | Coulter |
| 3,503,418 A | 3/1970 | Petrucci et al. |
| 3,664,371 A | 5/1972 | Schneider |
| 4,667,697 A | 5/1987 | Crawford |
| 4,700,741 A | 10/1987 | Murphy |
| 5,193,577 A | 3/1993 | de Koning |
| 5,193,579 A | 3/1993 | Bauer et al. |
| 5,226,445 A | 7/1993 | Surjaatmadja |

(Continued)

*Primary Examiner* — P. Macade Nichols
(74) *Attorney, Agent, or Firm* — Stradley Ronon Stevens & Young, LLP

(57) ABSTRACT

A spherical pump valve. The valve includes a valve cage, a spring, a valve member, a valve seat, and a locking ring. The valve cage has a groove holding the spring and threads. The valve member has a stem and a trench holding the spring. The valve seat has a seating surface, threads that match the valve cage threads and upon threaded engagement secure the valve seat to the valve cage, and a channel. The locking ring is installed in the channel and secures the valve cage to the valve seat. The spring has a rate matched to the weight of the valve member and to the flow area of the valve seat. The stem guides the valve member as the stem travels through a center hole of the valve cage. Also disclosed is a pump including the valve.

20 Claims, 11 Drawing Sheets

(56) References Cited

U.S. PATENT DOCUMENTS

| | | |
|---|---|---|
| 5,230,363 A | 7/1993 | Winn, Jr. et al. |
| 5,353,834 A | 10/1994 | Schmitt et al. |
| 5,435,337 A | 7/1995 | Kemp |
| 5,435,345 A | 7/1995 | Robinson et al. |
| 5,839,468 A | 11/1998 | Allred |
| 6,227,240 B1 | 5/2001 | Wu et al. |
| 6,623,259 B1 * | 9/2003 | Blume .................. F04B 53/164 417/454 |

* cited by examiner

SPHERICAL PUMP VALVE

TECHNICAL FIELD

The present disclosure relates generally to valves used in pumping operations and, more particularly, to a stem-guided, spring-assisted, and caged metal spherical suction and discharge valve for reciprocating pumps.

BACKGROUND OF THE INVENTION

A pump is a device that moves fluids, or sometimes slurries, by mechanical action. Pumps can be classified into three major groups according to the method they use to move the fluid: direct lift, displacement, and gravity pumps. A reciprocating pump is a class of positive-displacement pumps that includes the piston pump, plunger pump, and diaphragm pump. Well maintained, reciprocating pumps can last for decades. Unmaintained, however, they can succumb to wear and tear. Reciprocating pumps are often used where a relatively small quantity of liquid is to be handled and where delivery pressure is large. In reciprocating pumps, the chamber that traps the liquid is a stationary cylinder that contains a piston or plunger.

Check valves are devices that allow fluid to flow through a passageway in one direction but block flow in the reverse direction. Check valves are available from many sources, including the assignee of the subject invention (Triangle Pump Components, Inc. of Cleburne, Tex.), and are used in a variety of applications. One of the many industrial applications for check valves is in reciprocating pump assemblies. Reciprocating pumps are used by field workers in various operations to pressurize a slurry mixture of solids and liquids and transfer fluids and mixtures from one station to another.

For example, reciprocating pumps are used in drilling operations to pressurize a slurry mixture of solids and liquids known as drilling mud to the bottom of a hole drilled into the earth. The pressurized mud functions to lubricate and cool a downhole drill bit and to carry loosened sediment and rock pieces back to the surface. At the surface, the rock and sediment are removed from the returning drilling mud for examination and the filtered drilling mud is made available for reuse. In many cases, highly abrasive particles are present in the fluids that are pumped through the operation. These abrasive particles require that the valves and seals of the reciprocating pumps be designed to resist harsh abrasion, while maintaining positive sealing action and withstanding high operating pressures.

A schematic diagram of a conventional reciprocating pump 1 supported by check valves is shown in FIG. 1. Known in the last century, the reciprocating pump 1 includes a piston 21 that oscillates or reciprocates within a cylinder 20 in the direction shown by the arrows 24. A check valve 22 is provided at both the inlet 25 and the outlet 26 of the cylinder 20 to restrict the flow of fluid to one direction. At the fluid inlet 25, the check valve 22 is placed and oriented so that only inward flow is allowed. At the outlet 26, another check valve 22 is located so that only outward flow is allowed. The use of check valves 22 at the pump inlet 25 and outlet 26 enables the pump 1 to function in a relatively simple fashion that does not require a timing or driving mechanism to open and close other valves at the inlet 25 and outlet 26 at the appropriate times. The check valves 22 are often spring loaded; therefore, they are automatically shut at times of low or zero flow pressure. Effective check valves 22 for pumping applications are also designed so that pressure in the back-flow direction contributes to the strength of the sealing component in the check valve 22.

FIG. 2 illustrates the conventional check valve 22, which is typical of those previously used in reciprocating pumps 1, aligned along the longitudinal axis A. The conventional check valve 22 includes a valve body 81, a seal member 82, a biasing spring 83, and a spring retainer 84. The seal member 82 has a conical seal face 88 and guide legs 85 that facilitate alignment of the seal member 82 within the valve body 81. The valve body 81 has a corresponding conical valve seat 87, an inner diameter 89, and rotary retaining tabs 90 for engaging the spring retainer 84. The spring retainer 84 has rotary retaining hooks 91 and fluid flow passageways 86. The rotary retaining hooks 91 of the spring retainer 84 correspond with the rotary retaining tabs 90 of the valve body 81 to form a bayonet connector.

The check valve 22 is assembled by placing the seal member 82 into the valve body 81, placing the biasing spring 83 on top of the seal member 82, placing the spring retainer 84 over the biasing spring 83, compressing the biasing spring 83 until the spring retainer 84 meets the valve body 81, and engaging the bayonet connectors by turning the spring retainer 84 clockwise with respect to the valve body 81. Once assembled, the seal member 82 is free to move up and down within the assembly while the guide legs 85 assure that when in the down position, the seal face 88 of the seal member 82 aligns properly with the valve seat 87. This design of the check valve 22 allows flow from the valve body 81 through the spring retainer 84 but prevents the fluid from flowing from the spring retainer 84 through the valve body 81. The biasing spring 83 acts both to shut the check valve 22 during situations of low pressure and to maintain the tension required to keep the bayonet connection engaged.

It is preferred that all components of the reciprocating pump 1 be designed so that the flow of the working fluid is as unrestricted as possible. Obstructions to fluid flow in the reciprocating pump 1 can create fluid turbulence which increases the flow resistance of the fluid. The guide leg design of the conventional check valve 22 blocks the free flow of fluid from the valve body 81 to the spring retainer 84 and can increase flow resistance and cause undesirable turbulence. By increasing flow resistance, the efficiency (or ratio of work output to work input) of the reciprocating pump 1 can be adversely affected. Decreasing the efficiency of the reciprocating pump 1 increases the costs of operation.

Further, as mentioned above check valves are subjected to fluids having abrasive particles. An effective check valve design for reciprocating pump applications must be able to withstand abrasive particles and maintain a tight seal. The conventional check valve 22 tends to experience a tremendous amount of erosion wear and to fail prematurely when installed in solids-laden pumping applications. Still further, the conventional check valve 22 includes a single biasing spring 83 to compress the seal member 82 against the valve seat 87 and to maintain the bayonet connection between the valve body 81 and the spring retainer 84. In the event of failure or weakening of the biasing spring 83, the check valve 22 can come apart during operation and damage the surrounding components of the reciprocating pump 1.

Recognizing the drawbacks experienced with the conventional check valve 22 and desiring to prolong pump life and minimize operating costs, alternatives to the conventional design of the check valve 22 were developed. One alternative was marketed by HB Company, Inc., of Oklahoma City, Okla. during the 1980s and called a K-Plate valve disc (HB was later purchased by CoorsTek, Inc. of Denver, Colo.). HB glued a titanium valve disc together with a PEEK (polyetheretherketone) disc using a two-part adhesive. (PEEK is a high-performance engineering plastic with outstanding resistance to harsh chemicals, excellent mechanical strength, and dimensional stability.) The two-piece K-Plate disc held together under severe service conditions usually involving high fluid temperatures.

Another alternative was disclosed in U.S. Pat. No. 6,227,240 assigned to National-Oilwell L.P. of Houston, Tex.; issued in 2001; and titled "Unitized Spherical Profile Check Valve with Replaceable Sealing Element." The check valve 10 disclosed in the '240 patent is illustrated in FIG. 3. The unitized check valve 10 includes an outlet shroud 11, a biasing spring 12, a valve 18, a wave spring 15, and a valve body 16 disposed along a longitudinal axis B.

The valve 18 comprises a valve sealing disk 13, a replaceable seal 14, a biasing spring seat 32, a disk surface 34, a cutaway 36, and an outer diameter 38. The valve body 16 includes rotary bayonet connector tabs 52, a load face 54, a spherically profiled valve seat, and a fluid inlet. The profile of the spherical valve seat is described as the surface of intersection between the valve body 16 and an imaginary sphere that includes a radius and a center point that lies on the longitudinal axis B of valve body 16.

The disk surface 34 of the valve 18 is preferably spherical in profile and corresponds to the geometry of the spherical valve seat of the valve body 16. The spherical surfaces allow positive sealing without requiring precise alignment of the mating components. Other check valves that use conical sealing surface geometries require alignment guides to ensure that the valve seats and seals effectively. Because the check valve 10 does not require precise alignment of the valve sealing disk 13 with the valve body 16, no alignment guides are required. By removing the need for alignment guides, the flow through the check valve 10 is characterized as unobstructed, making the check valve 10 less flow restrictive than other designs.

The cutaway 36 is located at the bottom of the valve sealing disk 13 and functions to reduce the overall weight of the valve sealing disk 13. A groove or seal pocket defined between the outer diameter 38 of the valve 18 and an outside seal diameter 33 of the valve sealing disk 13 receives the replaceable seal 14. The replaceable seal 14 has a smaller inside diameter than the outside seal diameter 33 of the valve sealing disk 13. The replaceable seal 14 is installed on the valve sealing disk 13 by stretching it over a shoulder 40 of the valve sealing disk 13 until it rests within the seal pocket. Because it is removable from the valve sealing disk 13, the replaceable seal 14 can be easily replaced as it becomes worn, thus allowing a longer working life for the valve sealing disk 13.

The wave spring 15 functions to maintain the bayonet connection and to prevent undesired disassembly of the check valve 10 during operation. In unitized check valves without assembly maintenance springs such as the wave spring 15, the main biasing spring 12 acts as the only component securing the bayonet connector. If the biasing spring 12 fails or weakens, the bayonet connector can come apart during use, with serious consequences.

The commercial embodiment of the check valve 10 disclosed in the '240 patent has a number of drawbacks. The spherical disk surface 34 of the valve 18 and the spherical valve seat of the valve body 16 are lapped to match one another. As a result, National-Oilwell L.P. will not sell replacement valve components other than the replaceable seal 14. A customer must buy a whole new check valve 10 rather than replace worn components. This makes the check valve 10 more expensive for end users.

In addition, one of the advertised attributes of the commercial embodiment of the check valve 10 is that it is easy to disassemble because of its bayonet lug seat and cage design. This design according to National-Oilwell L.P. makes the check valve 10 easier to install and remove from the pump. The problem is that under service more often than not mud, paraffin, and other oil well-related debris cakes in the space between the cage and seat causing its lugs to be locked. Pump mechanics have stated that they have broken tools while attempting to remove the cage. Another problem with the commercial embodiment of the check valve 10 is that the replaceable seal 14, which is held in place by the groove or seal pocket in the metal valve 18, has an undesirable tendency to roll out of the seal pocket under service. The absence of the replaceable seal 14 in the seal pocket can cause catastrophic damage to the valve 18, rendering the check valve 10 incapable of pumping fluid.

Check valves and pump valves have similar design features, but their function and application differ. A check valve is normally positioned in a pipeline. It opens to allow forward flow and closes to prevent back flow. It is normally open for an extended period of time and only closes when the energy creating the forward flow ceases. On the other hand, a pump valve is positioned inside a reciprocating pump and opens and closes with every stroke of the pump and cycles hundreds of times per minute.

An object of the present disclosure is to overcome the shortcomings of conventional spherical valve designs. Therefore, a related object of the present disclosure is to provide an improved spherical valve. Another object is to provide a pump including the improved spherical pump valve.

Conventional spherical valve designs include an insert held in place by a grooved metal valve member. The insert of the conventional design has a tendency to roll out of the groove during service causing catastrophic damage to the valve member and rendering the valve assembly incapable of pumping fluid. An object of the present disclosure is to eliminate, or at least minimize, the possibility of the valve insert dislodging during service.

Conventional spherical valve designs include a valve member without a stem. The conventional valve member is only guided by the valve spring and legs of the valve cage. This design leaves the valve member vulnerable to landing cocked on the seating surface possibly not sealing completely in the closed position. It is another object of the present disclosure to guide the valve member to a precise "centered" landing on the seating surface of the valve.

Conventional spherical valve designs also use a valve cage with bayonet-style lugs to fasten the valve cage to the valve seat. These lugs have a tendency to wear out over time causing the valve cage to back off during service. As a result, the valve assembly comes apart with its components pumped at high pressure through the liquid end of the pump causing catastrophic damage to the liquid end, plungers, and neighboring valve assemblies. Yet another object of the present disclosure is to prevent, or at least minimize the risk of, separation of the components of the valve during service.

Another issue with a conventional lug-style valve cage is related to the investment casting process. The lug portion of the mold tends to wear down over time as the casting molds are repeatedly used. This wear causes the lugs to be undersized and to back off during service. The lug-style valve cage also has a tendency to have sediment and debris packed in between the valve cage and the valve seat making it extremely difficult to remove the valve cage during valve disassembly. An additional object of the present disclosure is to prevent the undersized or worn out lug issue. A related object is to prevent sediment and debris from packing in between the valve cage and the valve seat making the valve cage much easier to remove during disassembly of the valve.

SUMMARY OF THE DISCLOSURE

To achieve these and other objects, and in view of its purposes, the present disclosure provides a valve for a reciprocating pump. The valve includes at least five, main components as follows: a valve cage, a first spring, a valve member, a valve seat, and a locking ring. The valve cage has at least one groove, a center hole, and valve cage threads. The first spring has a head held in position in the at least one groove of the valve cage, a foot, and a spring rate. The valve member has a periphery, a weight, a bottom surface, and a top surface with a stem and a trench holding the foot of the first spring securely in place in a position near the periphery of the valve member to help stabilize the valve member under operation. The valve seat has a flow area, a seating surface with a radius, valve seat threads that match the valve cage threads of the valve cage and upon threaded engagement secure the valve seat to the valve cage, and a channel located just below the valve seat threads. The locking ring is installed in the channel of the valve seat, the locking ring securing the valve cage to the valve seat through mechanical deformation preventing the valve cage from backing off during service and serving as a seal and a barrier keeping debris and fine sediments from accumulating between the valve cage and the valve seat. The spring rate of the first spring is matched to the weight of the valve member and to the flow area of the valve seat. The stem of the valve member guides the valve member as the stem travels through the center hole of the valve cage, ensuring that the valve member is centered when the valve member is positioned proximate the seating surface of the valve seat. Also disclosed is a pump including the valve.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE DISCLOSURE

Figure 1:
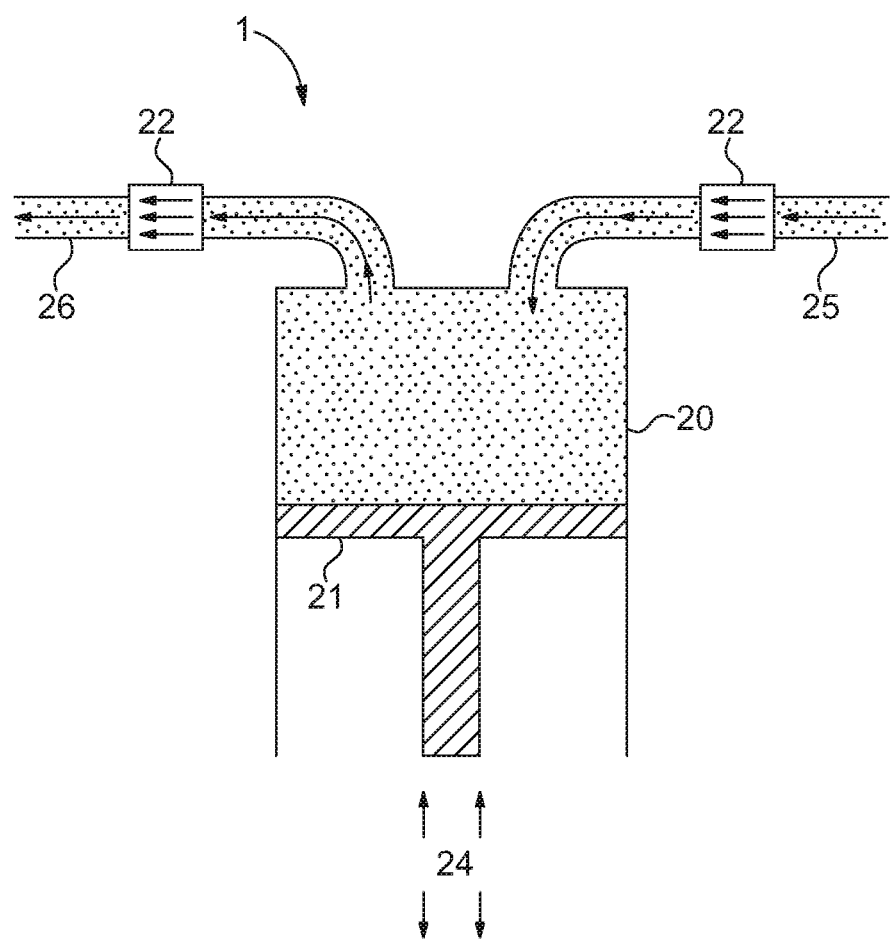
FIG. 1 is a schematic representation of a conventional reciprocating pump that uses inlet and outlet check valves.
Figure 2:
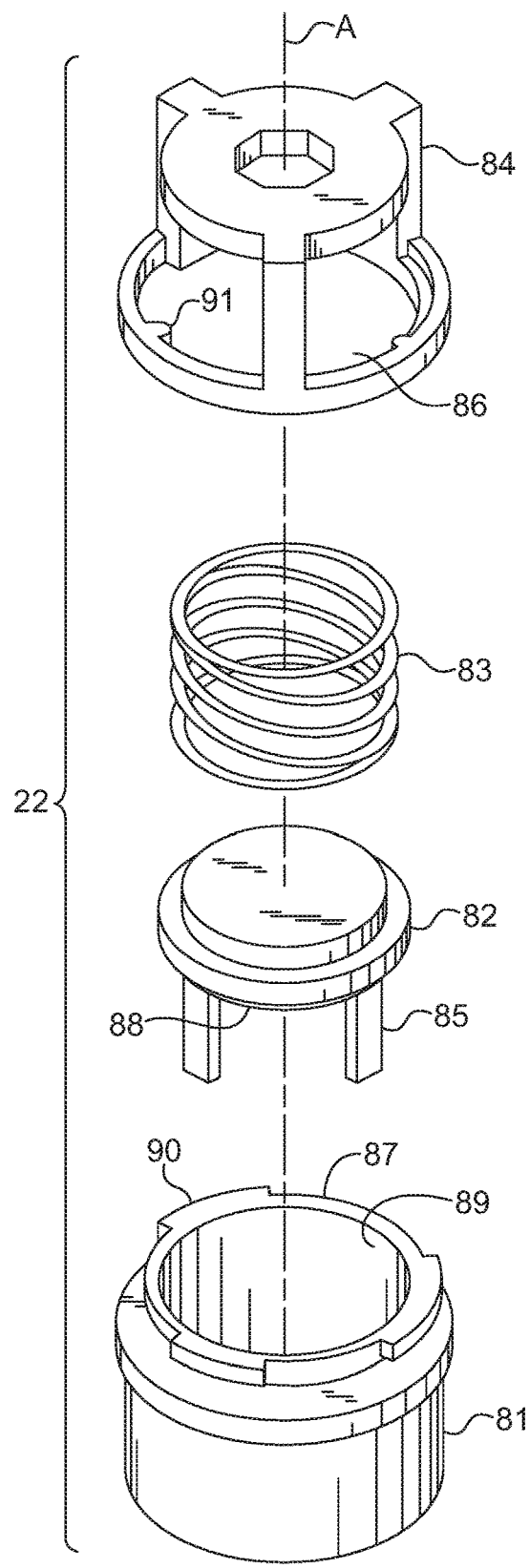
FIG. 2 is an exploded view of a conventional check valve.
Figure 3:
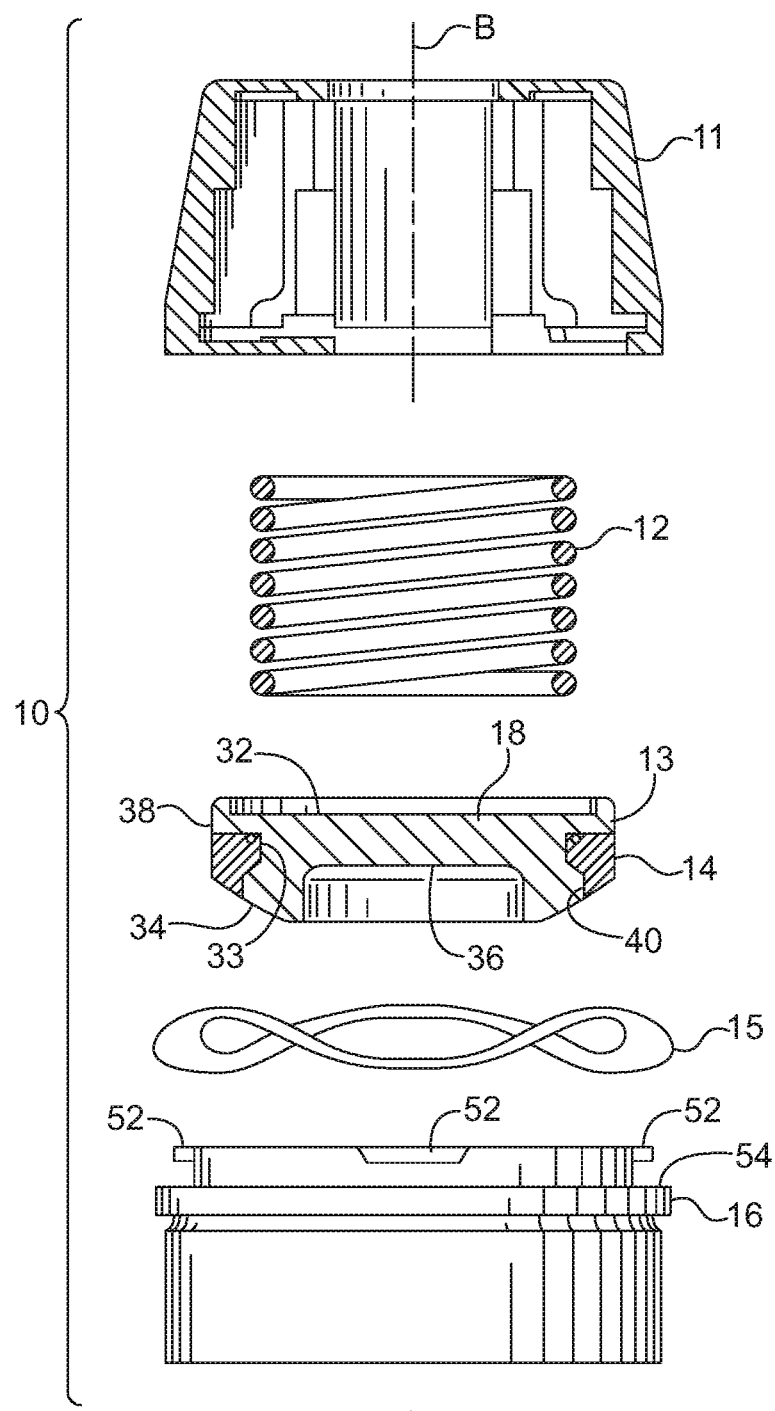
FIG. 3 is an exploded view of a check valve as disclosed in U.S. Pat. No. 6,227,240.
Figure 4:
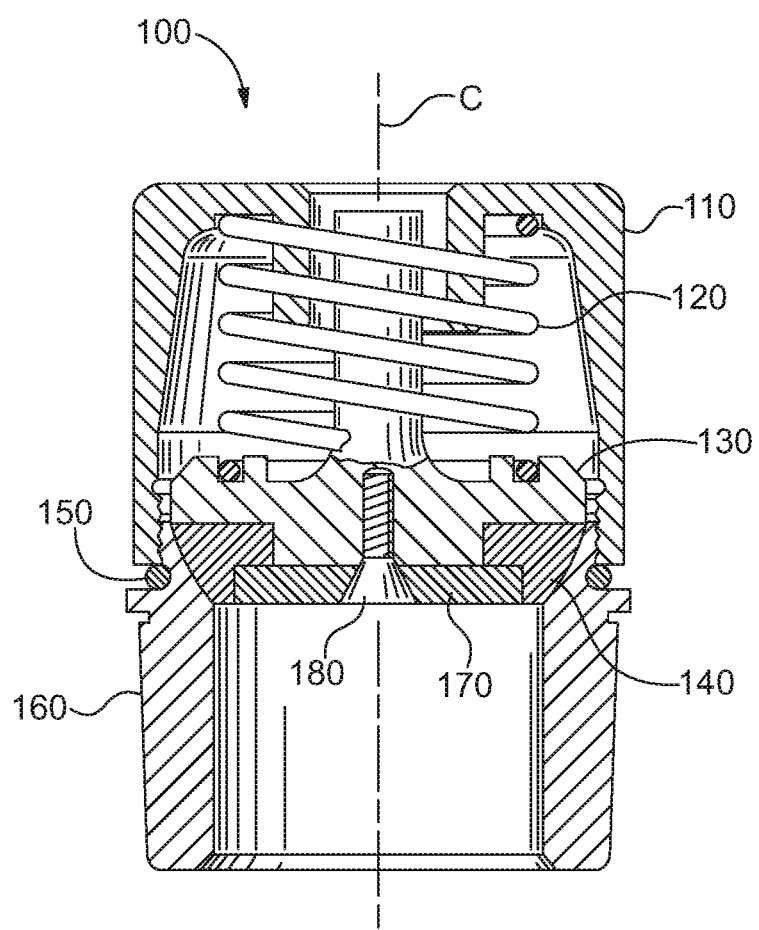
FIG. 4 illustrates in a cross-sectional view one embodiment of an inserted valve as fully assembled according to the present disclosure.
Figure 5:
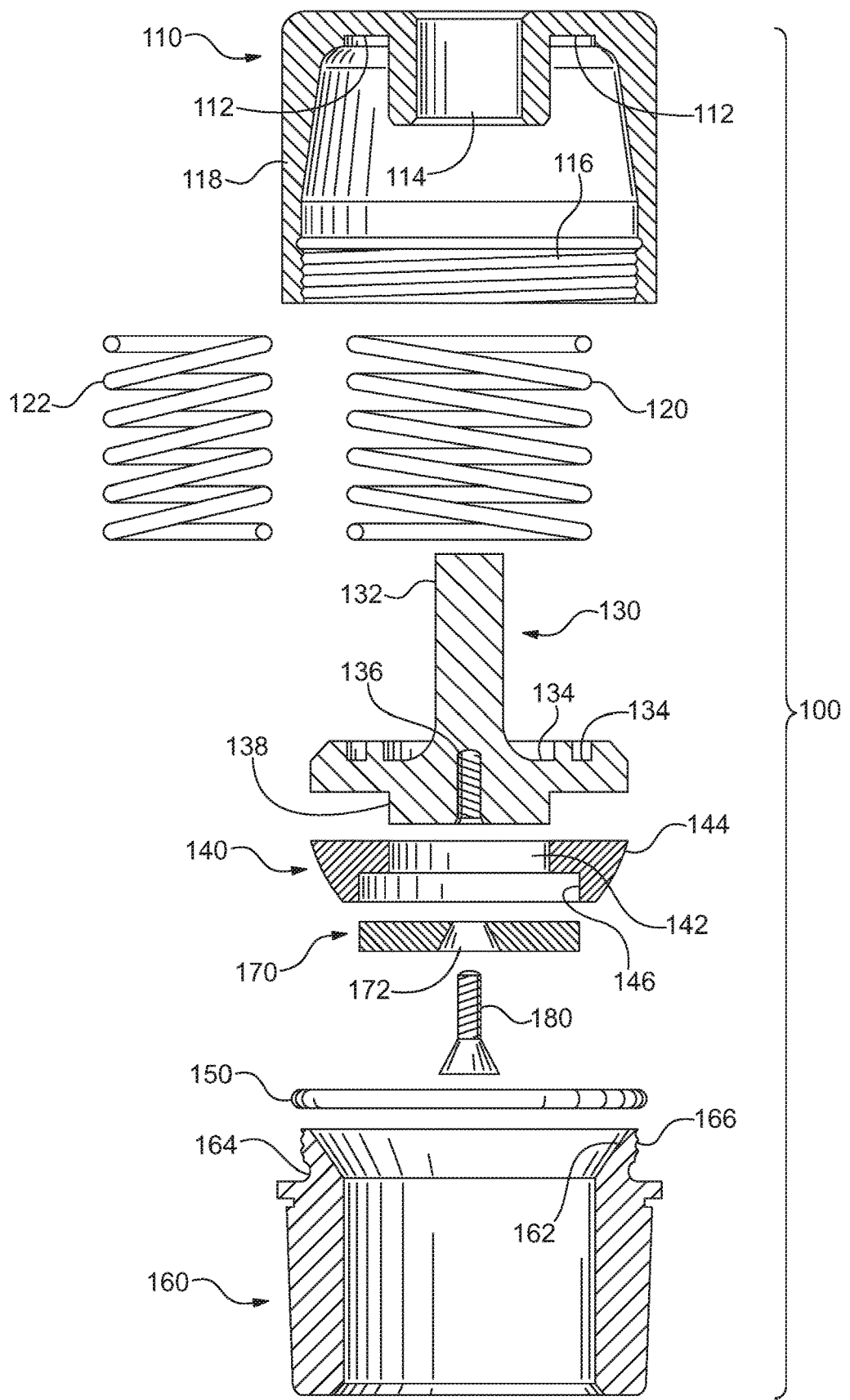
FIG. 5 is an exploded view of the valve shown in FIG. 4 illustrating the components of the valve separately and in position for assembly.

Referring now to the drawing, in which like reference numbers refer to like elements throughout the various figures that comprise the drawing, FIG. 4 shows one embodiment of a valve 100 according to the present disclosure. The valve 100 is called an "inserted" valve 100 because it includes a valve insert 140. FIG. 4 illustrates in a cross-sectional view the valve 100 as fully assembled. FIG. 5 is an exploded view of the valve 100 shown in FIG. 4 illustrating the components of the valve 100 separately and in position for assembly.

The valve 100 includes eight, main components as follows: a valve cage 110, a main valve spring 120, a valve member 130, the valve insert 140, a locking ring 150, a valve seat 160, a base plate 170, and a screw 180. Optionally, a secondary valve spring 122 may be included as a ninth component of the valve 100. Each of these components is aligned along, and is symmetrical about, the longitudinal axis C. Each of these components is discussed below, sequentially and in more detail.

The valve cage 110 functions as a retainer to hold the main valve spring 120 and (optionally) the secondary valve spring 122 in place. The valve cage 110 also serves as a guide for the valve member 130. The valve cage 110 is machined from a casting into a finished, integral piece. By "integral" is meant a single piece or a single unitary part that is complete by itself without additional pieces, i.e., the part is of one monolithic piece formed as a unit. Typically, the valve cage 110 is cast primarily from 316 stainless steel but can be manufactured from a number of other metals depending on the pump application, the type of liquid pumped, and the working temperature.

Figure 6A:
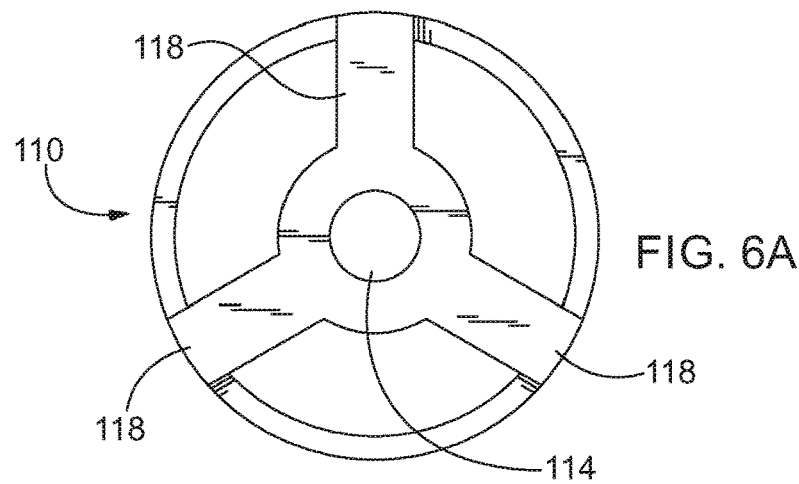
FIG. 6A is top view of the valve cage component of the valve illustrated in FIGS. 4 and 5.

The valve cage 110 has one or more grooves 112 machined into the underside of the top portion of the valve cage 110 to hold the main valve spring 120 and (optionally) the secondary valve spring 122 securely in place. A center hole 114 is cast into the valve cage 110 through which a stem 132 of the valve member 130 travels. The center hole 114 functions as a guide to ensure that the valve member 130 is centered when the valve member 130 is positioned proximate the seating surface 162 of the valve seat 160. The valve cage 110 also has valve cage threads 116. The valve cage threads 116 help to secure the valve cage 110 to the valve seat 160 when the valve cage threads 116 engage the corresponding valve seat threads 166 on the valve seat 160. Finally, the valve cage 110 has at least one support leg 118. In a preferred embodiment of the valve cage 110, as shown in the top view of the valve cage 110 illustrated in FIG. 6A, the valve cage 110 has three legs 118 spaced equally around the valve cage 110 (i.e., at intervals of 120 degrees).

The main valve spring 120 is typically manufactured from stainless steel, such as 316SS, or from Inconel. Inconel is a registered trademark of Huntington Alloys Corporation of West Virginia for a family of austenitic nickel-chromium-based superalloys. The main valve spring 120 is the larger of the two springs that may be included in the valve 100, with a higher spring rate than the secondary valve spring 122. A spring is an elastic object that stores mechanical energy. Springs are typically made of spring steel. Although there are many spring designs, coil springs are preferred for the valve 100. When a conventional spring, without stiffness variability features, is compressed or stretched from its resting position, it exerts an opposing force approximately proportional to its change in length (this approximation breaks down for larger deflections). The rate or spring constant of a spring is the change in the force it exerts, divided by the change in deflection of the spring. Thus, the rate of the spring is the gradient of the force versus deflection curve and is expressed in units of force divided by distance, for example N/mm. The inverse of spring rate is compliance: if a spring has a rate of 10 N/mm, it has a compliance of 0.1 mm/N. The stiffness (or rate) of springs in parallel is additive, as is the compliance of springs in series.

The main valve spring 120 may be used alone when the pump including the valve 100 is operating at normal pressures (adequate suction pressure) and low-to-moderate (i.e., average) pump speeds (RPMs). The main valve spring 120 is matched to the weight of the valve member 130 and to the flow area of the valve seat 160 to ensure that opening and closing of the valve 100 is synchronized with the operation of the pump. The main valve spring 120 provides enough resistance to keep the valve member 130 from totally compressing the main valve spring 120 upon opening and thus preventing the valve member 130 from impacting the valve cage 110 with damaging force and enough resistance to aid in closing the valve 100 without the valve member 130 damaging the seating surface 162 of the valve seat 160. At optimum performance, the valve member 130 lifts just enough so that the lift area is equal to the flow area of the valve seat 160. The main valve spring 120 is positioned near the outside portion or periphery of the valve member 130 to help stabilize the valve member 130 under operation.

The secondary valve spring 122 is smaller in width than the main valve spring 120, is lighter, and has a lesser spring rate. The secondary valve spring 122 is equal in length to the main valve spring 120, however, and is made from the same material. The coiling direction of the secondary valve spring 122 is opposite that of the main valve spring 120 to prevent entanglement. The secondary valve spring 122 may be installed in the valve 100 alone if the pump is experiencing low suction pressure or used in conjunction with the main valve spring 120 if the pump is operating at higher pressures, higher speeds (RPMs), or both higher pressures and higher speeds. The secondary valve spring 122 is installed inside the main valve spring 120.

The spring rates of the secondary valve spring 122 and the main valve spring 120 are balanced to the flow area and weight of the valve member 130 using a formula referred to as "pounds per square inch of valve area" (POSIVA) where POSIVA=$F_i$ (installed force, lb) divided by $A_v$ (valve through area, $in^2$). A ratio of 2 POSIVA is used for poor suction pressure, 4 POSIVA for normal suction conditions, and 6 POSIVA for charged suction systems of 20 to 40 PSI or higher.

The valve member 130 functions as the liquid sealing component of the valve 100. The valve member 130 may be machined from a casting or steel bar stock. Preferably, the valve member 130 is primarily made from 316SS or heat treated 174SS but can be manufactured from a number of other metals depending on the application of the pump, the type of liquid pumped, and the working temperature. As indicated above, the stem 132 of the valve member 130 guides the valve member 130 as the valve member 130 travels through the center hole 114 of the valve cage 110. Such guidance ensures that the valve member 130 is centered when the valve member 130 is positioned proximate the seating surface 162 of the valve seat 160.

Figure 6B:
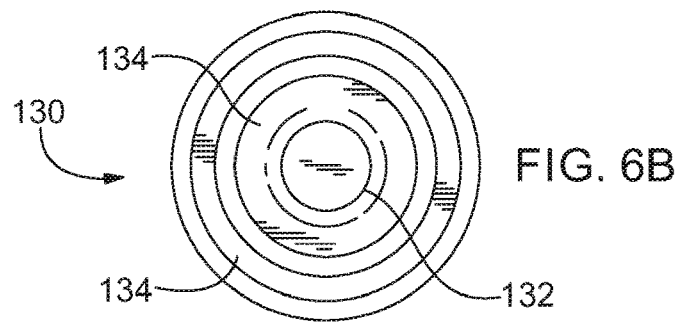
FIG. 6B is a top view of the valve member component of the valve illustrated in FIGS. 4 and 5.
Figure 6C:
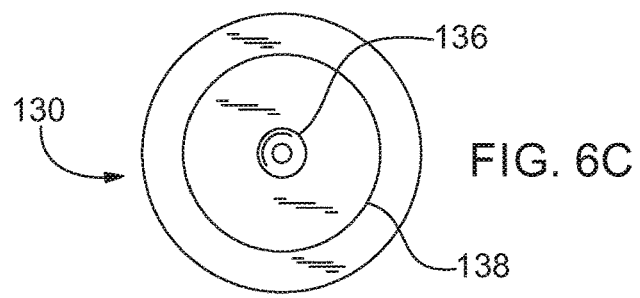
FIG. 6C is a bottom view of the valve member component of the valve illustrated in FIGS. 4 and 5.

The valve member 130 has one or more trenches 134 machined into the top surface of the valve member 130 to hold the main valve spring 120 and (optionally) the secondary valve spring 122 securely in place. An aperture 136 is drilled, tapped, and counter sunk into the bottom of the valve member 130 to receive the screw 180. Finally, a step 138 (which may be round or, as shown in FIGS. 4 and 5, L-shaped) is machined in the bottom surface of the valve member 130. FIG. 6B is a top view and FIG. 6C is a bottom view of the valve member 130. The step 138 matches the dimensions of the inside diameter of a center opening 142 of the valve insert 140 as well as the flat top surface and outside diameter of the valve insert 140.

Turning to the valve insert 140, that component is typically (although not necessarily) spherical. Preferably, the valve insert 140 is machined from a thermoplastic polymer material. The material may be polypropylene, polyketone, polyetheretherketone, or any of a variety of thermoplastic polymers depending on the application of the pump, the type of liquid pumped, and the working temperature.

Polyketone is a semi-crystalline thermoplastic material having characteristics that fulfill the requirements of various pump applications. A polyketone valve insert 140 allows that component to be used in areas with high mechanical, tribological, and chemical requirements at the same time. The material is ideal for components subject to continuous dynamic stress and high load alternation. The low water absorption rate of 0.4% in an average climate allows use of polyketone in environments where components contact moisture. Polyketone offers good resilience; low moisture absorption; high abrasion resistance; high impact strength; a wear rate that is incredibly low in comparison with other polymers when it is used with friction partners made of the same material; and dimensional stability.

Polyketone is available from Röchling Engineering Plastics SE & Co. KG of Germany under the registered trademark Sustakon. The Sustakon material is not as elastic as insert materials that are normally used in valves but it is resistant to temperatures as high as 250° F. as opposed to a maximum 160° F. for normal insert materials. The Sustakon material is also more abrasion resistant making it last longer in service. Because the Sustakon material is more rigid, it cannot be stretched over the valve member 130 and wedged into place in a machined groove as in conventional valve members. Therefore, the design of the valve 100 has been modified to accommodate the more rigid valve insert 140. The valve insert 140 is securely fixed to the bottom surface of the valve member 130 and to the top surface of the base plate 170 using a two-part epoxy adhesive.

The valve insert 140 has an outer edge 144 defining the outside diameter of the valve insert 140. The outer edge 144 is machined to a spherical radius matching the outside diameter of the valve member 130 and the radius of the seating surface 162 of the valve seat 160. As illustrated in FIGS. 4 and 5, the matching radii may approximate a 45° angle. Such an angle aids in moving debris away from outer edge 144 and the seating surface 162, and reduces the weight of the valve member 130 making the component more efficient in opening and closing while in service. More generally, the weight of the metal portion of the valve member 130 has been decreased by increasing the depth and width of the trenches 134 and removing metal from the valve member 130 wherever possible rendering the profile of the valve member 130 shorter and skinnier. One of the advantages of including the valve insert 140 in the valve 100 is that the valve insert 140 displaces metal allowing the valve member 130 to weigh less and function more efficiently.

The valve insert 140 has a cutout 146 machined into the bottom of the valve insert 140. The center opening 142 of the valve insert 140 is preferably round or circular and matches the step 138 of the valve member 130 in width and height. Similarly, the cutout 146 of the valve insert 140 matches the height and width of the base plate 170.

The base plate 170 is preferably machined from 316SS round bar but can be made from other metals as circumstances dictate. The base plate 170 secures the valve insert 140 to the valve member 130 and also serves to support the valve insert 140 during operation of the valve 100. The base plate 170 is preferably round in shape with a counter sunk center bore 172. The outer dimensions (height and width) of the base plate 170 match the inner dimensions (height and width) of the cutout 146 of the valve insert 140. The counter sunk center bore 172 allows the top of the screw 180 to lie flush with the base plate 170 when installed.

The screw 180 is preferably made from 316SS but can be made from other materials as circumstances dictate. The function of the screw 180 is to secure the base plate 170 and the valve insert 140 to the valve member 130. The screw 180 is just one suitable example of a more general fastener that can perform the required function. A more specific type of fastener preferable as the screw 180 is a flat hex head socket screw 180 as illustrated in FIGS. 4 and 5. The threads of the screw 180 are secured to the valve member 130 with an anaerobic adhesive. Torque is applied to the screw 180 in an amount sufficient to secure the screw 180 in place to predetermined specifications. By "predetermined" is meant determined beforehand, so that the predetermined characteristic must be determined, i.e., chosen or at least known, in advance of some event.

Figure 6D:
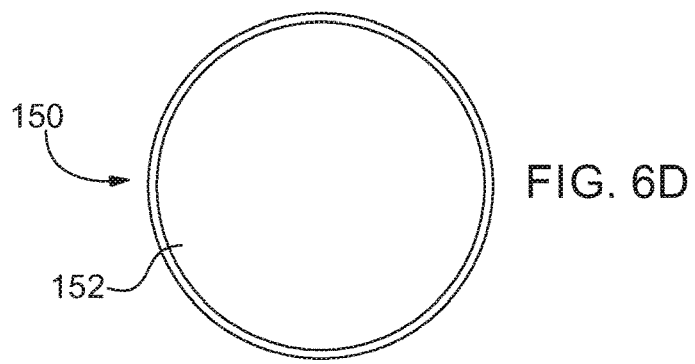
FIG. 6D is a top view of the locking ring component of the valve illustrated in FIGS. 4 and 5.

As illustrated in the top view of the locking ring 150 shown in FIG. 6D, that component is typically round (circular) in shape defining a large center orifice 152. The locking ring 150 is typically made from acrylonitrile butadiene rubber. Other heat resistant and more chemical-resistant materials are also suitable for the locking ring 150. The locking ring 150 is installed in a channel 164 machined in the valve seat 160 just below the valve seat threads 166. The function of the locking ring 150 is to secure the valve cage 110 to the valve seat 160 through mechanical deformation preventing the valve cage 110 from backing off during service. The locking ring 150 also serves as a seal and a barrier keeping debris and fine sediments often found in pumped liquids from building up in the space between the valve cage 110 and the valve seat 160. This buildup can make removing the valve cage 110 very difficult during disassembly.

The purpose of the valve seat 160 is to secure the valve 100 into the deck (port) of the liquid end of a pump (see below). The valve seat 160 is manufactured with enough wall thickness to prevent the valve seat 160 from deforming under extreme pressure and at the same time provide as much flow area for pumped liquids as possible. The valve seat 160 is preferably manufactured from stainless steel bar stock such as 316SS or heat treated 174SS but can be manufactured from a number of other metals depending on the application of the pump, the type of fluid pumped, and the working temperature.

As described above, the spherical radius of the seating surface 162 of the valve seat 160 matches the radius of the spherical outer edge 144 of the valve insert 140. The valve seat threads 166 of the valve seat 160 match the valve cage threads 116 of the valve cage 110 and, upon threaded engagement, secure the valve seat 160 to the valve cage 110. The machined channel 164 of the valve seat 160 receives the locking ring 150.

Conventional spherical valve designs include an insert held in place by a grooved metal valve member. The insert of the conventional design has a tendency to roll out of the groove during service causing catastrophic damage to the valve member and rendering the valve assembly incapable of pumping fluid. The valve 100 disclosed above eliminates, or at least minimizes, the possibility of the valve insert 140 dislodging during service. The base plate 170 and screw 180 secure the valve insert 140 in place during the most severe conditions experienced in pump operation. The machined step 138 located on the bottom of the valve member 130 gives additional support to the valve insert 140 and is "beefy" enough to support the screw 180.

Figure 7:
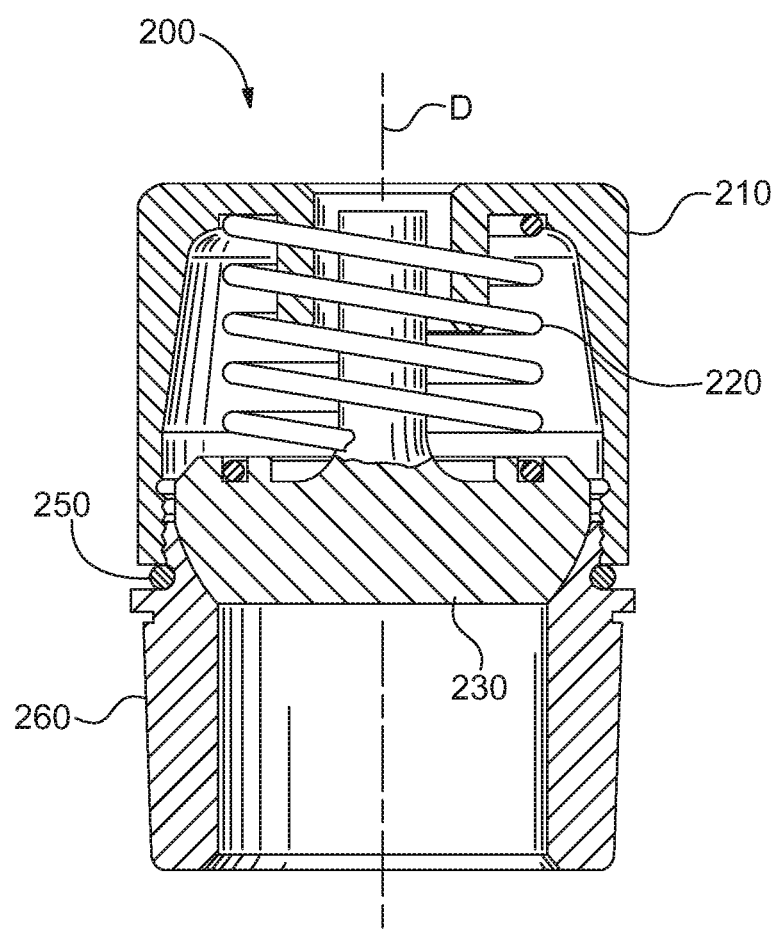
FIG. 7 illustrates in a cross-sectional view an embodiment of a metal-to-metal valve as fully assembled according to the present disclosure.
Figure 8:
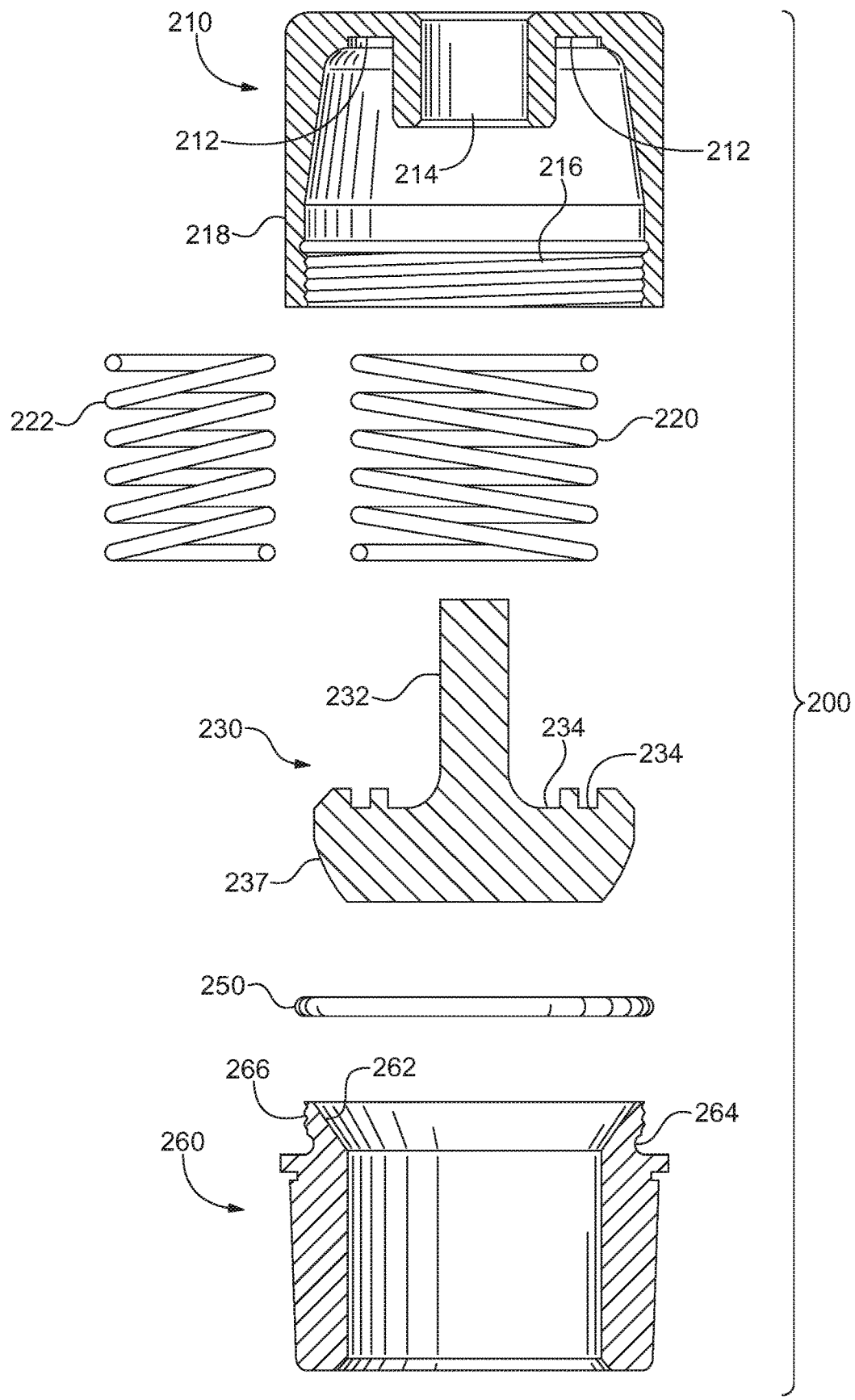
FIG. 8 is an exploded view of the valve shown in FIG. 7 illustrating the components of the valve separately and in position for assembly.

FIG. 7 shows another embodiment of a valve 200 according to the present disclosure. The valve 200 is called a "metal-to-metal" valve 200 because it does not include a valve insert 140. FIG. 7 illustrates in a cross-sectional view the valve 200 as fully assembled. FIG. 8 is an exploded view of the valve 200 shown in FIG. 7 illustrating the components of the valve 200 separately and in position for assembly.

The valve 200 includes five, main components as follows: a valve cage 210, a main valve spring 220, a valve member 230, a locking ring 250, and a valve seat 260. Optionally, a secondary valve spring 222 may be included as a sixth component of the valve 200. Each of these components is aligned along, and is symmetrical about, the longitudinal axis D. Each of these components is discussed below, sequentially and in more detail.

The valve cage 210 is virtually identical to the valve cage 110. Thus, the valve cage 210 functions as a retainer to hold the main valve spring 220 and (optionally) the secondary valve spring 222 in place. The valve cage 210 also serves as a guide for the valve member 230. The valve cage 210 is machined from a casting into a finished, integral piece. Typically, the valve cage 210 is cast primarily from 316 stainless steel but can be manufactured from a number of other metals depending on the pump application, the type of liquid pumped, and the working temperature.

Figure 9A:
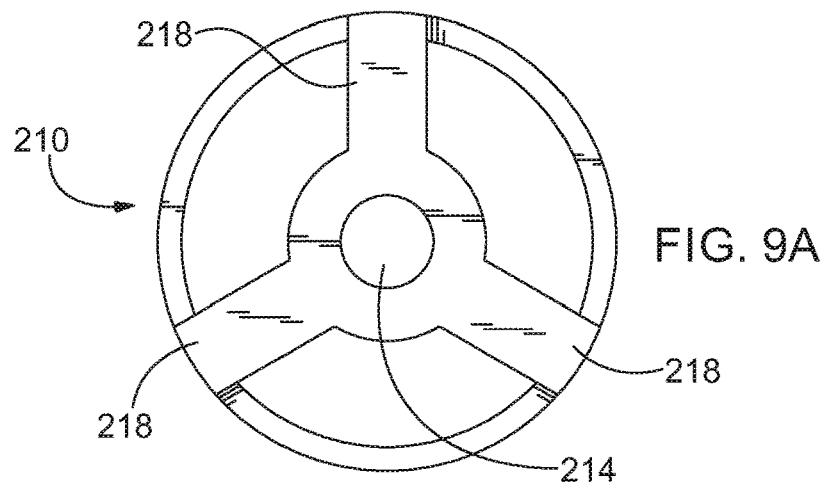
FIG. 9A is top view of the valve cage component of the valve illustrated in FIGS. 7 and 8.

The valve cage 210 has one or more grooves 212 machined into the underside of the top portion of the valve cage 210 to hold the main valve spring 220 and (optionally) the secondary valve spring 222 securely in place. A center hole 214 is cast into the valve cage 210 through which a stem 232 of the valve member 230 travels. The center hole 214 functions as a guide to ensure that the valve member 230 is centered when the valve member 230 contacts the seating surface 262 of the valve seat 260. The valve cage 210 also has valve cage threads 216. The valve cage threads 216 help to secure the valve cage 210 to the valve seat 260 when the valve cage threads 216 engage the corresponding valve seat threads 266 on the valve seat 260. Finally, the valve cage 210 has at least one support leg 218. In a preferred embodiment of the valve cage 210, as shown in the top view of the valve cage 210 illustrated in FIG. 9A, the valve cage 210 has three legs 218 spaced equally around the valve cage 210 (i.e., at intervals of 120 degrees).

The main valve spring 220 and the secondary valve spring 222 of the valve 200 are virtually identical to their respective counterparts, namely the main valve spring 120 and the secondary valve spring 122, of the valve 100. Therefore, the characteristics and functionality of the main valve spring 220 and the secondary valve spring 222 are not repeated.

The valve member 230 functions as the liquid sealing component of the valve 200. The valve member 230 may be machined from a casting or steel bar stock. Preferably, the valve member 230 is primarily made from 316SS or heat treated 174SS but can be manufactured from a number of other metals depending on the application of the pump, the type of liquid pumped, and the working temperature. As indicated above, the stem 232 of the valve member 230 guides the valve member 230 as the valve member 230 travels through the center hole 214 of the valve cage 210. Such guidance ensures that the valve member 230 is centered when the valve member 230 contacts the seating surface 262 of the valve seat 260.

The valve member 230 has one or more trenches 234 machined into the top surface of the valve member 230 to hold the main valve spring 220 and (optionally) the secondary valve spring 222 securely in place. The valve member 230 has an outer surface 237 defining the outside diameter of the valve member 230. The outer surface 237 is machined to a spherical radius matching the outside diameter of the valve member 230 and the radius of the seating surface 262 of the valve seat 260. As illustrated in FIGS. 7 and 8, the matching radii may approximate a 45° angle. Such an angle aids in moving debris away from the outer surface 237 and the seating surface 262, and reduces the weight of the valve member 230 making the component more efficient in opening and closing while in service.

Figure 9B:
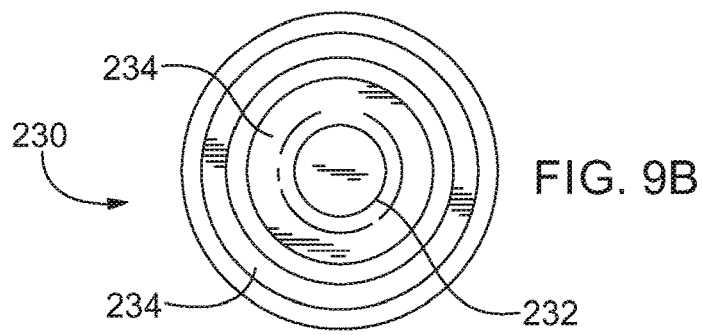
FIG. 9B is a top view of the valve member component of the valve illustrated in FIGS. 7 and 8.
Figure 9C:
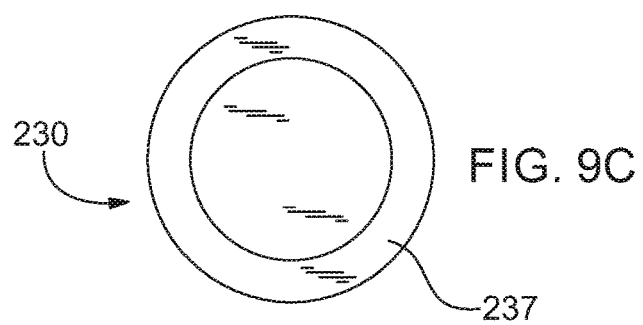
FIG. 9C is a bottom view of the valve member component of the valve illustrated in FIGS. 7 and 8.

FIG. 9B is a top view and FIG. 9C is a bottom view of the valve member 230. Absent from the valve member 230 are two features that are included on the valve member 130: the aperture 136 and the step 138.

Figure 9D:
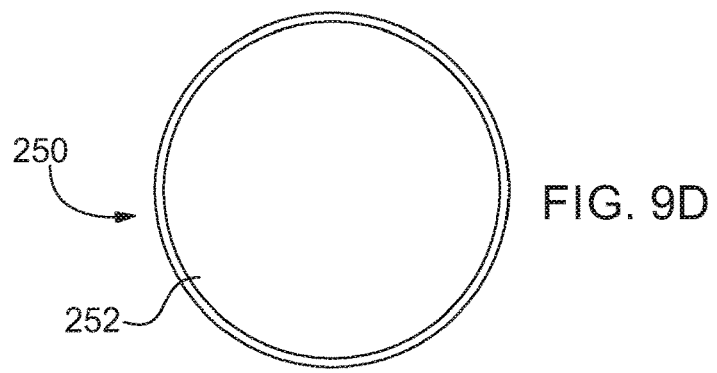
FIG. 9D is a top view of the locking ring component of the valve illustrated in FIGS. 7 and 8.

The locking ring 250 is virtually identical to the locking ring 150. Thus, as illustrated in the top view of the locking ring 250 shown in FIG. 9D, that component is typically round (circular) in shape defining a large center orifice 252. The locking ring 250 is typically made from acrylonitrile butadiene rubber. Other heat resistant and more chemical-resistant materials are also suitable for the locking ring 250. The locking ring 250 is installed in a channel 264 machined in the valve seat 260 just below the valve seat threads 266. The function of the locking ring 250 is to secure the valve cage 210 to the valve seat 260 through mechanical deformation preventing the valve cage 210 from backing off during service. The locking ring 250 also serves as a seal and a barrier keeping debris and fine sediments often found in pumped liquids from building up in the space between the valve cage 210 and the valve seat 260. This buildup can make removing the valve cage 210 very difficult during disassembly.

The valve seat 260 is virtually identical to the valve seat 160. Thus, the purpose of the valve seat 260 is to secure the valve 200 into the deck (port) of the liquid end of a pump (see below). The valve seat 260 is manufactured with enough wall thickness to prevent the valve seat 260 from deforming under extreme pressure and at the same time provide as much flow area for pumped liquids as possible. The valve seat 260 is preferably manufactured from stainless steel bar stock such as 316SS or heat treated 174SS but can be manufactured from a number of other metals depending on the application of the pump, the type of fluid pumped, and the working temperature.

As described above, the spherical radius of the seating surface 262 of the valve seat 260 matches the radius of the spherical outer surface 237 of the valve member 230. The valve seat threads 266 of the valve seat 260 match the valve cage threads 216 of the valve cage 210 and, upon threaded engagement, secure the valve seat 260 to the valve cage 210. The machined channel 264 of the valve seat 260 receives the locking ring 250.

Figure 10:
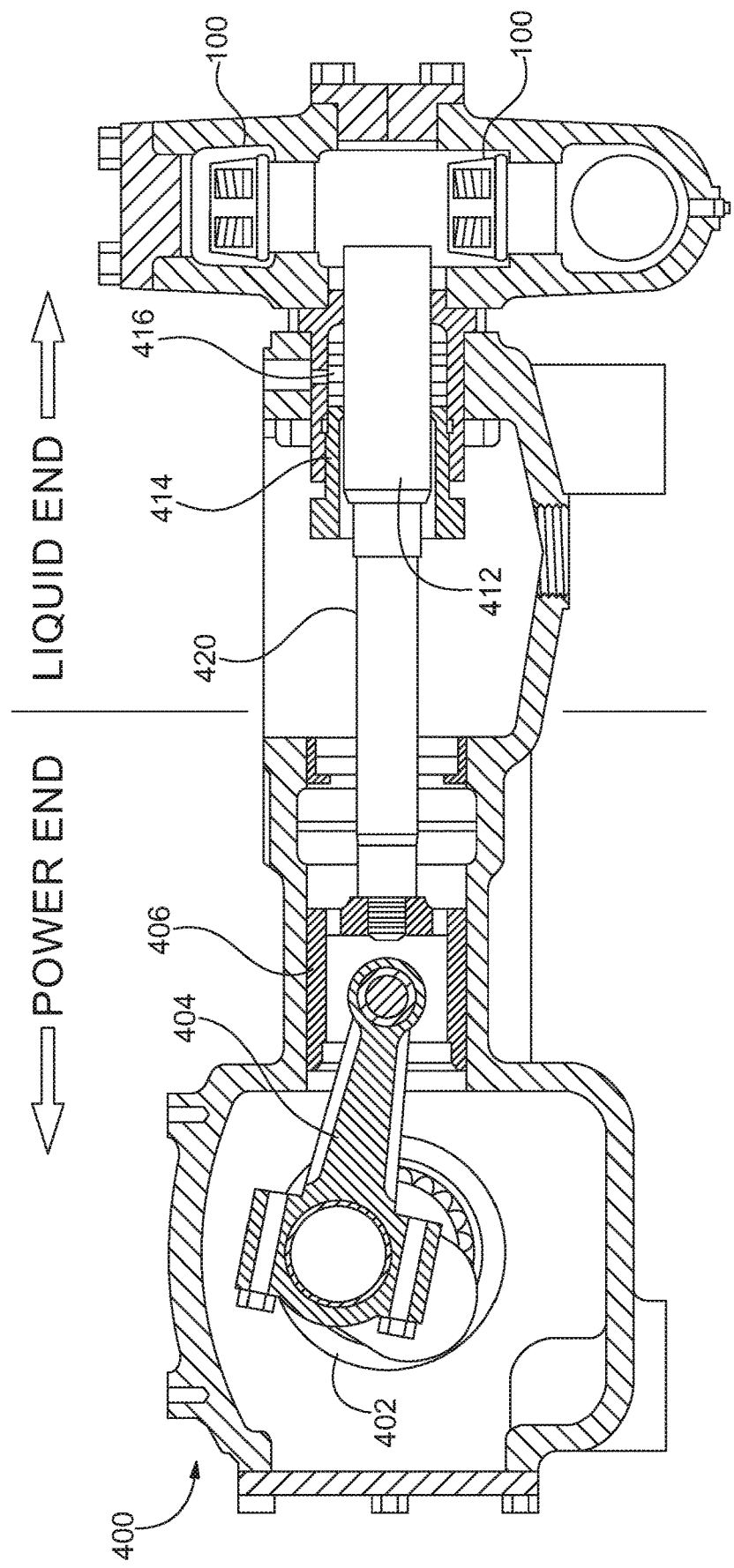
FIG. 10 illustrates a positive displacement reciprocating plunger pump including the inserted valve shown in FIG. 4 as both the discharge valve and the suction valve of the pump.

The valves 100, 200 described above can be used in a wide variety of applications. One example application is as a component in a typical positive displacement reciprocating plunger pump. A positive displacement reciprocating plunger pump 400 including a valve 100 as both the discharge valve (above) and the suction valve (below) is illustrated in FIG. 10. As illustrated, the pump 400 can be divided into two distinct working areas: a power end containing a crankshaft 402, a connecting rod 404, and a crosshead 406 very similar to the components of an automobile; and a liquid end containing a plunger (or piston) 412, a stuffing box 414 with packing 416, and the suction and discharge valves. An extension rod 420 bridges the two working areas.

The power end crosshead 406 and the liquid end plunger 412 are connected by the extension rod 420, which is typically made of metal. Power is supplied to the crankshaft 402 causing the crankshaft 402 to rotate clockwise moving the crosshead 406 in a back and forth or translating motion. The extension rod 420 and the plunger 412 move back and forth in sequence with the crosshead 406. The stuffing box 414 houses the packing 416 and acts as a seal to prevent leakage of fluid around the sliding plunger 412.

Figure 11:
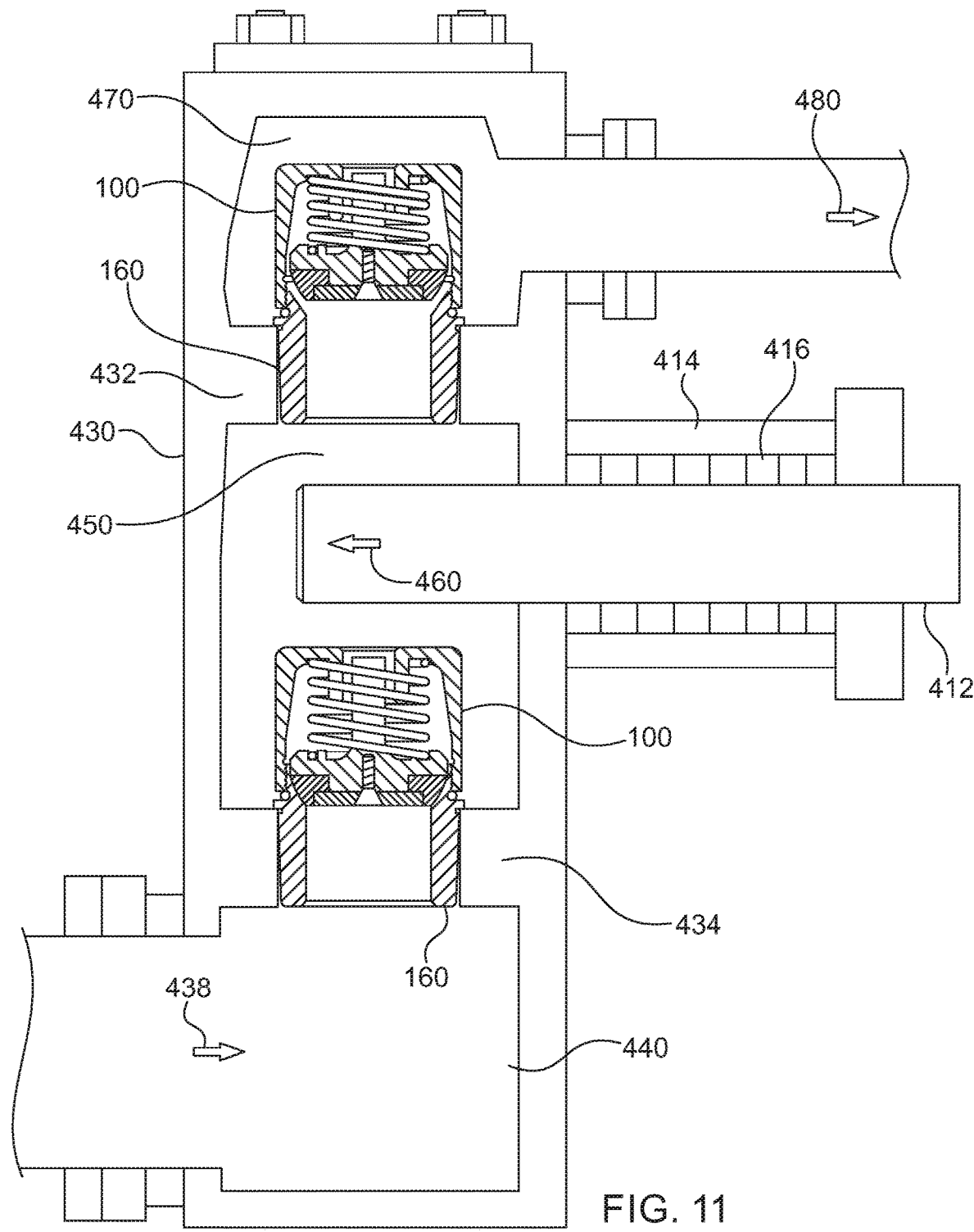
FIG. 11 illustrates a portion of the liquid end of the pump shown in FIG. 10.

The functions of the valves 100 provided as both the discharge valve (top) and the suction valve (bottom) in the pump 400 are described with reference to FIG. 11. FIG. 11 illustrates a portion 430 of the liquid end of the pump 400. The valve 100 which functions as the discharge valve is secured via its valve seat 160 to a discharge valve deck (or port) 432 of the pump 400. The valve 100 which functions as the suction valve is secured via its valve seat 160 to a suction valve deck (or port) 434 of the pump 400.

Liquid flows under pressure from its source through a suction piping inlet, along a direction arrow 438, and into a manifold 440 located at the base of the liquid end portion 430. As the plunger 412 advances into a suction chamber 450 of the pump 400, along a direction arrow 460, liquid is displaced in a volume equal to the diameter and the length of stroke of the cylindrical plunger 412. This action increases pressure in the suction chamber 450 such that the pressure is greater than the pressure in the manifold 440 forcing the suction valve 100 closed and the discharge valve 100 open. Liquid is forced under pressure into a discharge chamber 470 of the pump 400 and out of the liquid end through piping along a direction arrow 480.

As the plunger 412 retreats back toward the power end, a vacuum is created in the suction chamber 450 closing the discharge valve 100 and opening the suction valve 100. The liquid contained in the manifold 440 is now under greater pressure than the pressure in the suction chamber 450. This pressure differential forces the liquid from the manifold 440 into the suction chamber 450. Both the suction valve 100 and the discharge valve 100 are closed simultaneously when the plunger 412 reaches the end of its retreat toward the power end and begins its advance toward the liquid end. The cycle is repeated as long as the pump 400 is under power.

The pump 400 includes a fixed metal wall cavity that does not move. The suction chamber 450 is larger than the discharge chamber 470. Fluid is displaced by the reciprocating motion of the plunger 412 in and out of the suction chamber 450. Pressure increases as fluid is forced from the larger suction chamber 450 into a smaller discharge chamber 470. The volume is a constant given each cycle of operation. Positive displacement reciprocating plunger pumps such as the pump 400 are sometimes called constant-volume pumps because they maintain a constant speed and flow. Even if the system pressure varies, the flow remains constant.

The pump 400 can handle a variety of fluid types: high, low, and variable viscosity; shear sensitive fluids; and liquids with a high percentage of solids, air, or gas entrainment. The capacity of the pump 400 is not affected by the operation pressure. The pump 400 is excellent for applications with flows below 100 gpm and pressures above 100 psi. The pump 400 can be 10 to 40 points more efficient than centrifugal pumps when handling viscous fluids. The pump 400 is able to self-prime. The pump 400 is suitable for a wide variety of applications, such as handling low viscosity chemicals or oils, high pressure cleaning, moving ore slurries, drilling mud, reverse osmosis, saltwater injection, hot oil applications, blow out preventers, and subsea applications.

Both the inserted valve 100 and the metal-to-metal valve 200 described above have a valve member 130, 230 with a valve stem 132, 232 that travels through the center hole 114, 214 of the valve cage 110, 210. The stem 132, 232 guides the valve member 130, 230 to a precise "centered" landing (directly or indirectly) on the seating surface 162, 262. Conventional spherical valve designs include a valve member without a stem. The conventional valve member is only guided by the valve spring and legs of the valve cage. This design leaves the valve member vulnerable to landing cocked on the seating surface possibly not sealing completely in the closed position.

Conventional spherical valve designs also use a valve cage with bayonet-style lugs to fasten the valve cage to the valve seat. These lugs have a tendency to wear out over time causing the valve cage to back off during service. As a result, the valve assembly comes apart with its components pumped at high pressure through the liquid end of the pump causing catastrophic damage to the liquid end, plungers, and neighboring valve assemblies.

Another issue with a conventional lug-style valve cage is related to the investment casting process. The lug portion of the mold tends to wear down over time as the casting molds are repeatedly used. This wear causes the lugs to be undersized and to back off during service. The lug-style valve cage also has a tendency to have sediment and debris packed in between the valve cage and the valve seat making it extremely difficult to remove the valve cage during valve disassembly.

In contrast, both the inserted valve 100 and the metal-to-metal valve 200 include a threaded valve cage 110, 210 with a locking ring 150, 250. The valve cage threads 116, 216 are machined and not cast, preventing the undersized or worn out lug issue. The locking ring 150, 250 prevents sediment and debris from packing in between the valve cage 110, 210 and the valve seat 160, 260 making the valve cage 110, 210 much easier to remove during disassembly of the valve 100, 200.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

What is claimed:

1. A valve comprising:
a valve cage having at least one groove, a center hole, and valve cage threads;
a first spring having a head held in position in the at least one groove of the valve cage, a foot, and a spring rate;
a valve member having a periphery, a weight, a bottom surface, and a top surface with a stem and a trench holding the foot of the first spring securely in place in a position near the periphery of the valve member to help stabilize the valve member under operation;
a valve seat having a flow area, a seating surface with a radius, valve seat threads that match the valve cage threads of the valve cage and upon threaded engagement secure the valve seat to the valve cage, and a channel located just below the valve seat threads; and
a locking ring installed in the channel of the valve seat, the locking ring securing the valve cage to the valve seat through mechanical deformation preventing the valve cage from backing off during service and serving as a seal and a barrier keeping debris and fine sediments from accumulating between the valve cage and the valve seat,
wherein the spring rate of the first spring is matched to the weight of the valve member and to the flow area of the valve seat and the stem of the valve member guides the valve member as the stem travels through the center hole of the valve cage, ensuring that the valve member is centered when the valve member is positioned proximate the seating surface of the valve seat.

2. The valve according to claim 1 further comprising a second spring installed inside the first spring.

3. The valve according to claim 2 wherein the second spring is smaller in width, equal in length, and lighter than the first spring, has a lesser spring rate than the first spring, and has a coiling direction opposite that of the first spring to prevent entanglement.

4. The valve according to claim 1 wherein the spring rate of the first spring is matched to the weight of the valve member and to the flow area of the valve seat using a POSIVA formula.

5. The valve according to claim 1 wherein the valve member has an outer surface with a spherical radius defining the outside diameter of the valve member and matching the radius of the seating surface of the valve seat.

6. The valve according to claim 1 wherein the valve member has a bottom surface defining a step and including an aperture.

7. The valve according to claim 6 further comprising a fastener inserted into the aperture of the valve member; a valve insert having a center opening into which the step of the valve member fits and through which the fastener passes; and a base plate having a top surface and a bore through which the fastener passes, wherein the fastener secures the base plate and the valve insert to the valve member.

8. The valve according to claim 7 wherein the valve insert is securely fixed to the bottom surface of the valve member and to the top surface of the base plate using an adhesive, has an outer edge with a spherical radius matching the radius of the seating surface of the valve seat, and includes a cutout into which the base plate fits.

9. The valve according to claim 7 wherein the valve insert is made of polyketone.

10. The valve according to claim 7 wherein the fastener is secured in the aperture of the valve member using an adhesive.

11. The valve according to claim 1 wherein the valve seat is adapted to secure the valve to a deck of a pump.

12. A valve for a reciprocating pump having a deck, the valve comprising:
a valve cage having at least one groove, a center hole, and valve cage threads;
a first spring having a head held in position in the at least one groove of the valve cage, a foot, and a spring rate;
a second spring installed inside the first spring;
a valve member having a periphery, a weight, a bottom surface, and a top surface with a stem and a trench holding the foot of the first spring securely in place in a position near the periphery of the valve member to help stabilize the valve member under operation;
a valve seat secured to the deck of the pump and having a flow area, a seating surface with a radius, valve seat threads that match the valve cage threads of the valve cage and upon threaded engagement secure the valve seat to the valve cage, and a channel located just below the valve seat threads; and
a locking ring installed in the channel of the valve seat, the locking ring securing the valve cage to the valve seat through mechanical deformation preventing the valve cage from backing off during service and serving as a seal and a barrier keeping debris and fine sediments from accumulating between the valve cage and the valve seat,
wherein the spring rate of the first spring is matched to the weight of the valve member and to the flow area of the valve seat and the stem of the valve member guides the valve member as the stem travels through the center hole of the valve cage, ensuring that the valve member is centered when the valve member is positioned proximate the seating surface of the valve seat.

13. The valve according to claim 12 wherein the second spring is smaller in width, equal in length, and lighter than the first spring, has a lesser spring rate than the first spring, and has a coiling direction opposite that of the first spring to prevent entanglement.

14. The valve according to claim 12 wherein the spring rate of the first spring is matched to the weight of the valve member and to the flow area of the valve seat using a POSIVA formula.

15. The valve according to claim 12 wherein the valve member has an outer surface with a spherical radius defining the outside diameter of the valve member and matching the radius of the seating surface of the valve seat.

16. The valve according to claim 12 wherein the valve member has a bottom surface defining a step and including an aperture.

17. The valve according to claim 16 further comprising a fastener inserted into the aperture of the valve member; a valve insert having a center opening into which the step of the valve member fits and through which the fastener passes; and a base plate having a top surface and a bore through which the fastener passes, wherein the fastener secures the base plate and the valve insert to the valve member.

18. The valve according to claim 17 wherein the valve insert is made of polyketone, is securely fixed to the bottom surface of the valve member and to the top surface of the base plate using an adhesive, has an outer edge with a spherical radius matching the radius of the seating surface of the valve seat, and includes a cutout into which the base plate fits.

19. The valve according to claim 17 wherein the fastener is secured in the aperture of the valve member using an adhesive.

20. A pump comprising:
a power end having a crankshaft, a crosshead, and a connecting rod that connects the crankshaft to the crosshead such that the crosshead translates when the crankshaft rotates under power;
a liquid end having a plunger and a stuffing box that houses packing and acts as a seal to prevent leakage of fluid around the plunger;
an extension rod connecting the crosshead and the plunger and bridging the power end and the liquid end, the extension rod and the plunger translating in sequence with the crosshead; and
a valve located in the liquid end, the valve including:
a valve cage having at least one groove, a center hole, and valve cage threads;
a first spring having a head held in position in the at least one groove of the valve cage, a foot, and a spring rate;
a valve member having a periphery, a weight, a bottom surface, and a top surface with a stem and a trench holding the foot of the first spring securely in place in a position near the periphery of the valve member to help stabilize the valve member under operation;
a valve seat having a flow area, a seating surface with a radius, valve seat threads that match the valve cage threads of the valve cage and upon threaded engagement secure the valve seat to the valve cage, and a channel located just below the valve seat threads; and
a locking ring installed in the channel of the valve seat, the locking ring securing the valve cage to the valve seat through mechanical deformation preventing the valve cage from backing off during service and serving as a seal and a barrier keeping debris and fine sediments from accumulating between the valve cage and the valve seat,
wherein the spring rate of the first spring is matched to the weight of the valve member and to the flow area of the valve seat and the stem of the valve member guides the valve member as the stem travels through the center hole of the valve cage, ensuring that the valve member is centered when the valve member is positioned proximate the seating surface of the valve seat.

* * * * *